United States Patent
Buryak et al.

(10) Patent No.: US 8,910,041 B1
(45) Date of Patent: Dec. 9, 2014

(54) FONT SUBSTITUTION USING UNSUPERVISED CLUSTERING TECHNIQUES

(75) Inventors: Kirill Buryak, Sunnyvale, CA (US); Vinay Shah, Weston, MA (US); Stuart George Gill, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 13/403,607

(22) Filed: Feb. 23, 2012

(51) Int. Cl.
*G06F 17/21* (2006.01)
*G06F 17/22* (2006.01)

(52) U.S. Cl.
USPC .......................................................... 715/269

(58) Field of Classification Search
CPC ..................................................... G06F 17/211
USPC .......................................................... 715/269
See application file for complete search history.

(56) References Cited

U.S. PATENT DOCUMENTS

| | | | | |
|---|---|---|---|---|
| 5,167,013 A | * | 11/1992 | Hube et al. | 358/1.11 |
| 5,825,987 A | * | 10/1998 | Asada | 358/1.11 |
| 6,041,323 A | * | 3/2000 | Kubota | 1/1 |
| 7,797,631 B2 | * | 9/2010 | Yoshida | 715/269 |
| 2007/0171446 A1 | * | 7/2007 | Yamamoto et al. | 358/1.11 |
| 2008/0189600 A1 | * | 8/2008 | Lau et al. | 715/235 |
| 2009/0063517 A1 | * | 3/2009 | Wright et al. | 707/100 |
| 2010/0268713 A1 | * | 10/2010 | McCarthy et al. | 707/737 |
| 2011/0093565 A1 | * | 4/2011 | Bacus et al. | 709/219 |
| 2011/0184827 A1 | * | 7/2011 | Hubert | 705/26.1 |
| 2011/0289407 A1 | * | 11/2011 | Naik et al. | 715/269 |
| 2013/0047078 A1 | * | 2/2013 | Bever et al. | 715/245 |
| 2013/0127872 A1 | * | 5/2013 | Kaplan | 345/467 |

* cited by examiner

*Primary Examiner* — James J Debrow

(74) *Attorney, Agent, or Firm* — Lerner, David, Littenberg, Krumholz & Mentlik, LLP

(57) ABSTRACT

Methods, systems, and apparatuses for determining a font substitution hierarchy using unsupervised clustering techniques are provided. A font substitution hierarchy may be determined by identifying a plurality of font request files associated with web-based application documents. Determining an association between a plurality of font requests within the plurality of font request files based on a clustering analysis, and determining a font substitution hierarchy for an individual font request based on the association.

14 Claims, 5 Drawing Sheets

FONT SUBSTITUTION USING UNSUPERVISED CLUSTERING TECHNIQUES

TECHNICAL FIELD

This specification relates generally to font substitution, and more particularly to methods for determining a font substitution hierarchy for web-based application documents.

BACKGROUND

Modern computer network applications are designed to be generally accessible. For example, the World Wide Web is accessible via the Internet through a variety of platform, browser and device combinations. However, due to portability, cost and other factors, the platform/browser/device combinations available to users for Web access can vary widely with regard to display and presentation capabilities.

Web-based application authors writing in a mark-up language (e.g., XML, HTML, XHTML) can specify document styling (i.e., the look and feel of documents), including display fonts to a network server, which may then determine a preferential hierarchy for which display fonts to use. For example, an author may include a list of primary fonts in a font request, and then specify a hierarchy of fallback fonts when particular primary fonts are not available. Standardized languages, including cascading style sheets, have been developed for streamlining the specification of document styling in mark-up language applications.

When the onus is on authors to specify document styling, however, fallback fonts are sometimes not specified in font requests. Further, even font requests that include fallback fonts may specify primary and fallback fonts that are not available for every type of platform/browser/device combination where a document might be presented. In such instances, a document may be presented with default or inaccurate fonts when primary fonts are not available for display. Default or inaccurate fonts are not optimal solutions, as they may degrade the user experience or render certain documents completely unusable.

SUMMARY

An autonomous font substitution hierarchy manager can be constructed by mining font request files from a library of Web-based application documents, e.g., from the World Wide Web, associating font requests and font substitution hierarchy patterns within the font request files based on a clustering analysis, and determining a font substitution hierarchy for individual font requests based on the association.

In accordance with an embodiment, a method for determining a font substitution hierarchy is provided. A plurality of font request files associated with web-based application documents are identified. An association between a plurality of font requests within the plurality of font request files is determined based on a clustering analysis, and a font substitution hierarchy for an individual font request is determined based on the association.

In accordance with an embodiment, a plurality of font substitution strings are generated for the clustering analysis based on the plurality of font requests. The plurality of font substitution strings may be based on a hierarchical ordering of the plurality of font requests within the plurality of font request files, and a plurality of n-grams may be generated based on the plurality of font substitution strings.

In accordance with an embodiment, one of a hierarchical agglomerative clustering, k-means clustering or distributed exchange algorithm may be executed for the clustering analysis.

In accordance with an embodiment, a parameter associated with a secondary attribute of the plurality of font requests is determined, and an association between the plurality of font requests is determined based on the clustering analysis and the secondary attribute parameter. The secondary attribute of the plurality of font requests may be a stylistic attribute, contextual attribute or frequency attribute. A secondary attribute parameter associated with the frequency attribute may be determined based on a frequency of instances where two or more font requests appear in sequence in the plurality of font request files. A bias for one or more secondary attribute parameters associated with the frequency attribute may be determined based on a commonality between the plurality of font request files.

These and other advantages of the present disclosure will be apparent to those of ordinary skill in the art by reference to the following detailed description and the accompanying drawings.

DETAILED DESCRIPTION

Figure 1:
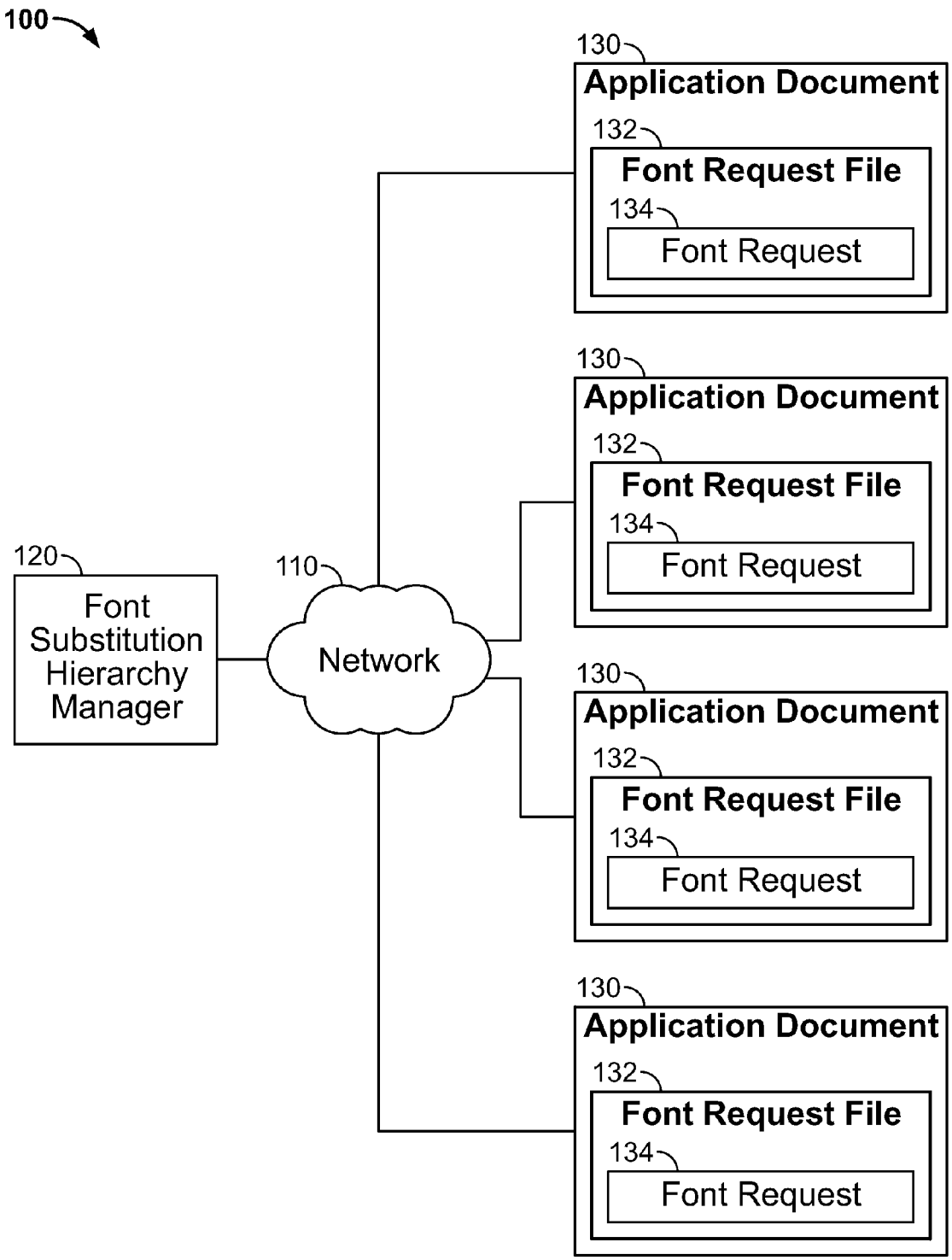
FIG. 1 is a diagram showing a cloud computing environment that may be used for determining a font substitution hierarchy in accordance with an embodiment.

FIG. 1 illustrates a communication system 100 that may be used to determine and provide a font substitution hierarchy in accordance with an embodiment. The communication system 100 includes a network 110, a font substitution hierarchy manager 120, and application documents 130 containing font request files 132 including one or more font requests 134.

In the exemplary embodiment of FIG. 1, network 110 is the Internet providing access to the World Wide Web, and the application documents 130 are Web-based documents. In other embodiments, network 110 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 110 may include a combination of different types of networks.

Font substitution hierarchy manager 120 determines a font substitution hierarchy and provides font substitution services. For example, the font substitution hierarchy manager 120 may identify font request files 132 (i.e., files that include one or more font requests) associated with application documents 130 and determine an association between the font requests 134 within the font request files 132. The font substitution hierarchy manager 120 may then associate the font requests 134, such as by performing a clustering analysis, in order to determine a font substitution hierarchy for individual font requests that may be applied generally to application documents via communication system 100.

Figure 2:
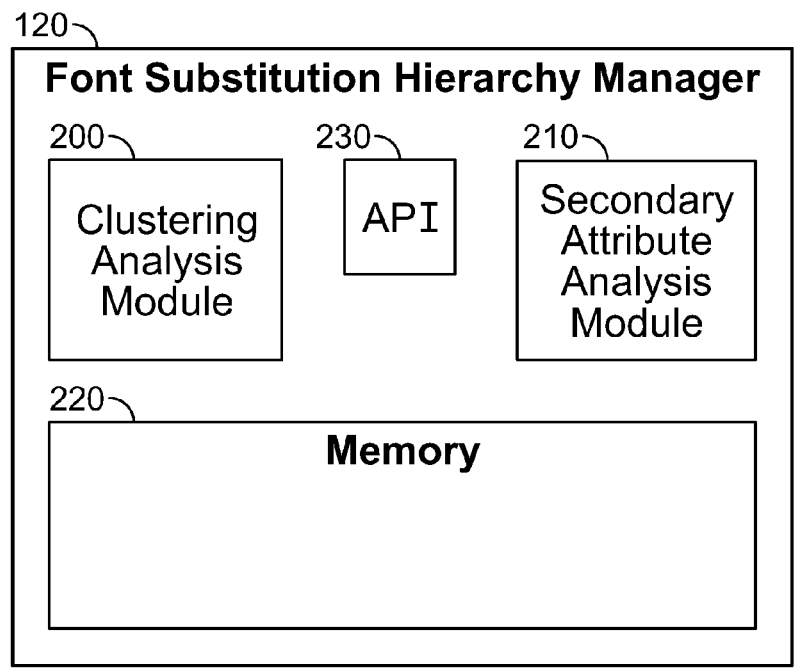
FIG. 2 is a diagram of a font substitution hierarchy manager in accordance with an embodiment.

FIG. 2 shows functional components of the font substitution hierarchy manager 120 in accordance with an embodiment. Font substitution hierarchy manager 120 includes clustering analysis module 200, secondary attribute analysis module 210, memory 220 and application programming interface (API) 230. Memory 220 is used by various components of font substitution hierarchy manager 120 to store data, including analysis data from clustering analysis module 200 and parameters associated with secondary attributes from the secondary attribute analysis module 210. API 230 is accessible for receiving font requests from applications via network 110, or alternatively, off-line. In general, font substitution hierarchy manager 120 can be used by Web-based tools and applications (e.g., web server applications, Web browsers, e-book readers, mobile handsets, document readers, etc.) to make dynamic decisions regarding font substitutions, such as when a specified font is not available on a given system/computing platform. In other exemplary embodiments, the font substitution hierarchy manager 120 may include alternative or additional components not shown in FIG. 2.

In one embodiment, clustering analysis module 200 identifies font requests 134 by indexing application documents 130 via network 110. For example, the clustering analysis module 200 may index application documents 130 by searching for application documents on the World Wide Web, and identifying the application documents 130 that contain font request files 132. Various font request file formats, such as cascading style sheets, include a font substitution hierarchy (e.g., a list of fallback font requests arranged in preferential order) when specified primary fonts are not available. For example, a font substitution hierarchy specifying a font-family of: "Times New Roman", "Georgia" and "serif", may direct the server to use the "Times New Roman" font if it is available, followed by "Georgia," and, if Georgia is not available, any serif font that is available. Further, it has been observed that application document authors generally specify similar font substitution hierarchies in font request files 132 due to, for example, the widespread usage of standardized Web design software applications. Therefore, the font request data extracted from the font request files 132 can provide a sufficiently diverse font request file dataset to build groups of similar font requests. With an indexed subset of application documents 130 containing font request files 132, the module 200 may then determine an association between the font requests 134 within the font request files 132 based on a clustering analysis.

In one embodiment, the clustering analysis may include executing one or more unsupervised clustering algorithms to cluster font requests 134 into groups based on similarity criteria. The one or more clustering algorithms may be designed to create a clustered arrangement of font requests 134 such that the similarity between the font requests 134 is maximized within each group. The unsupervised clustering algorithms may include, but are not limited to, hierarchical agglomerative clustering, k-means clustering, distributed exchange algorithms, or the like. Further, it will be appreciated by those skilled in the art that various other clustering means may be employed and/or combined to cluster font requests 134 for the purposes of a clustering analysis as described herein.

Figure 3:
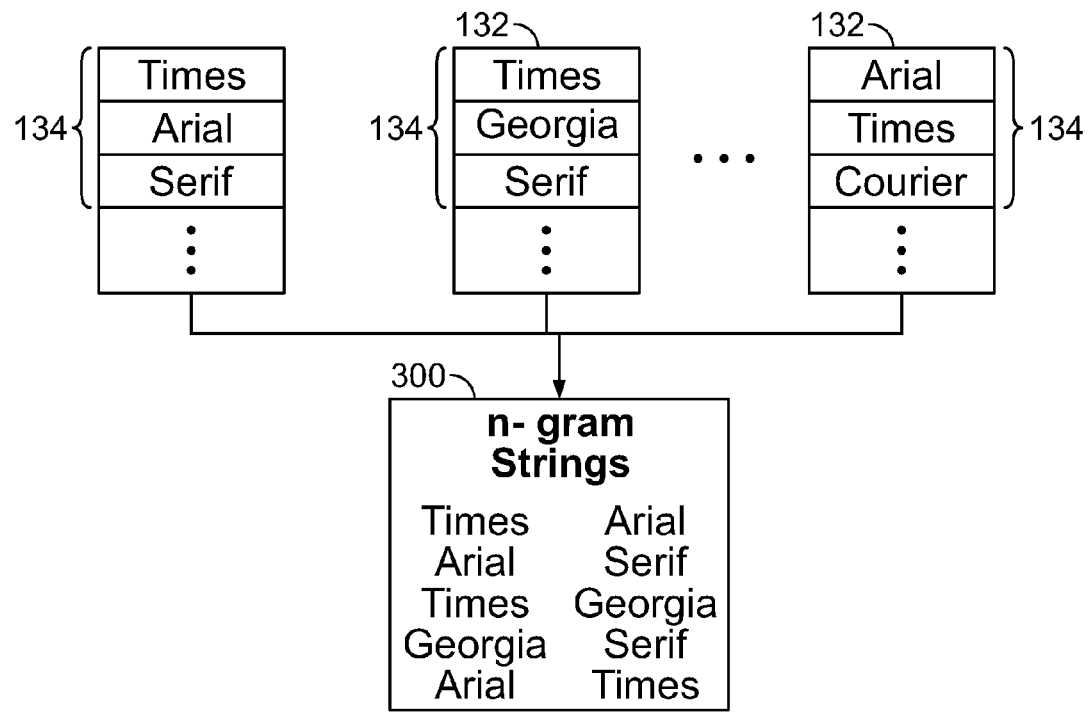
FIG. 3 is a diagram showing the collection of an input dataset for a clustering analysis in accordance with an embodiment.

FIG. 3 is a diagram showing the collection of an input dataset for a clustering analysis in accordance with an embodiment. In operation, clustering analysis module 200 collects font hierarchy data from indexed font request files 132. When a satisfactory font request file dataset (e.g., one or more font requests 134) is identified, clustering analysis module 200 executes an unsupervised clustering algorithm utilizing the font request files as input data. In one embodiment, clustering analysis module 200 may store in memory 220 information regarding the preferential ordering within font request files 132 by creating n-gram strings 300 (i.e., font request subsequences of 'n' length) for all available font substitution possibilities, and then use the n-grams as training inputs for the clustering algorithm. For example, for font request files 132 listing font hierarchies of Times/Arial/Serif, Times/Georgia/Serif, and Arial/Times/Courier; n-gram strings (of length n=2) include: Times/Arial; Arial/Serif; Times/Georgia; Georgia/Serif; Arial/Times; and Times/Courier.

Secondary attribute analysis module 210 determines an association between the font requests 134 within the font request files 132 based on additional attributes. A secondary attribute of the font requests might include any combination of stylistic, contextual, and frequency attributes. For example, a context attribute of the font requests might be that logos in application documents tend to use more stylized fonts than large blocks of text. A stylistic attribute of a particular font, e.g., nomenclature, font darkness, rounded edges vs. sharp edges, calligraphic fonts, monospace, fantasy and cursive fonts, etc., may be identified based on the fonts and font families that it is similar to, which can be used to improve the quality of the clustering analysis. Further, a frequency attribute may be based on a frequency of instances where two or more font requests appear in sequence in the font request files.

In operation, secondary attribute analysis module 210 determines one or more parameters associated with a secondary attribute of the font requests 134 as a further optimization of the clustering analysis. In one embodiment, the secondary attribute analysis module 220 also may determine that a large number of font request files have similar font hierarchy requests because the files were created using a common web design program (e.g., the font request files were autonomously created or the font requests were autonomously selected). For example, popular web design tools may offer default fallback font requests, which would be used more prevalently in the web pages developed with such tools. In such case, the secondary attribute analysis module 220 may account for skewing by biasing the analysis of such files before determining secondary attribute parameters.

Figure 4A:
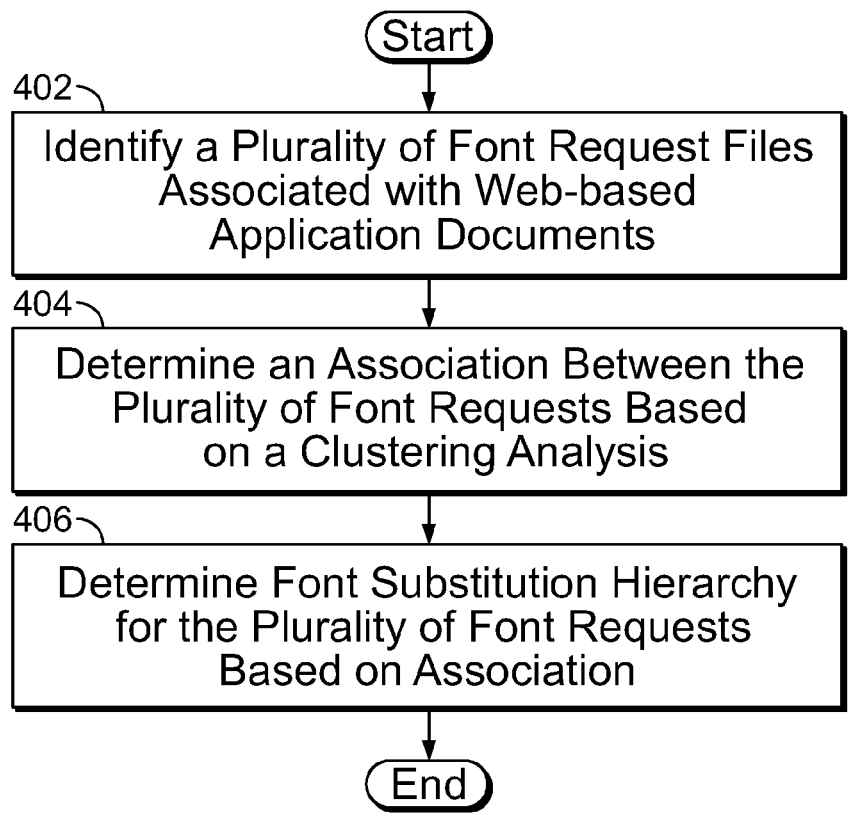
FIG. 4A is a flowchart of a process for determining a font substitution hierarchy based on a clustering analysis in accordance with an embodiment.

FIG. 4A is a flowchart of a process for determining a font substitution hierarchy based on a clustering analysis in accordance with an embodiment. At step 402, a plurality of font request files 132 associated with web-based application documents 130 are identified. For example, the clustering analysis module 200 may identify the plurality of font request files 132 via the World Wide Web from a plurality of web-based application documents 130, and index the font request files 132 based on clustering analysis criteria. At step 404, an association between a plurality of font requests 134 within the plurality of font request files 132 is determined based on a clustering analysis. For example, the clustering analysis module 200 may execute one or more unsupervised clustering algorithms to cluster font requests 134 within the files. The unsupervised clustering algorithms may include, for example, hierarchical agglomerative clustering, k-means clustering, or distributed exchange algorithms. At step 406, a font substitution hierarchy for individual font requests is determined based on the association.

Figure 4B:
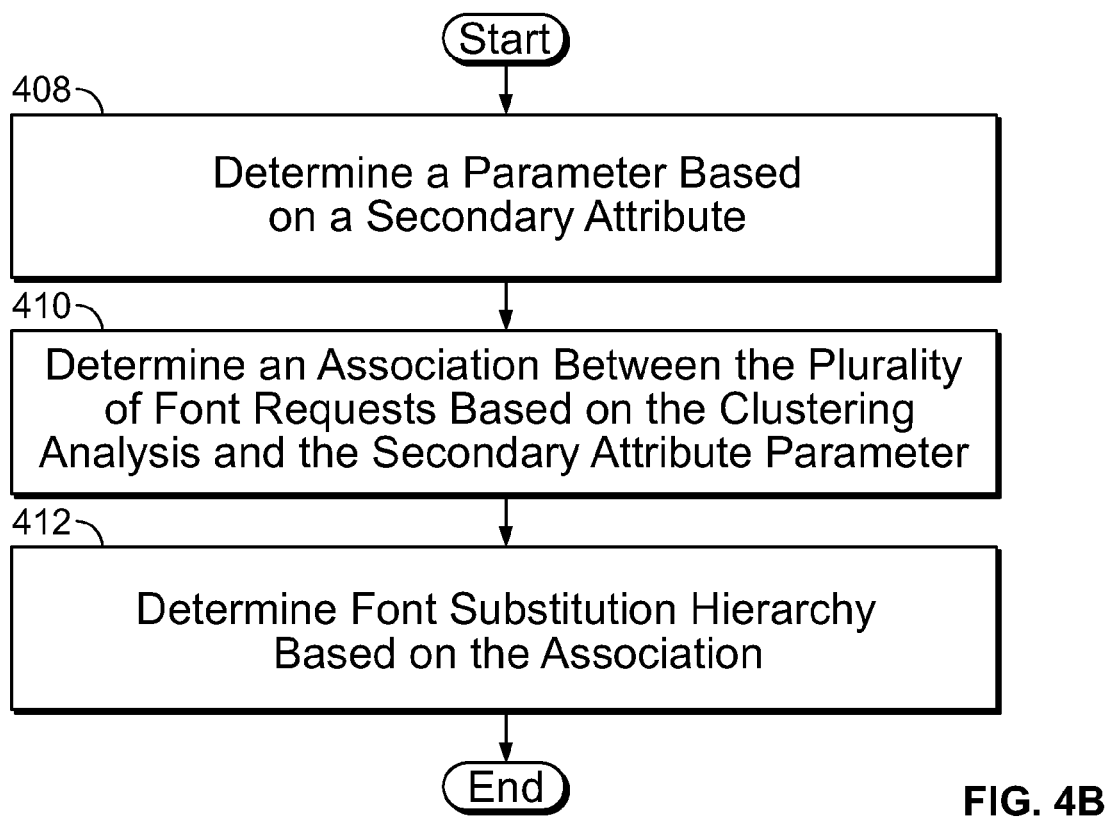
FIG. 4B is a flowchart of a process for determining a font substitution hierarchy additionally based on a secondary attribute in accordance with an embodiment.

FIG. 4B is a flowchart of a process for determining a font substitution hierarchy additionally based on a secondary attribute in accordance with an embodiment. At step 408, a parameter associated with a secondary attribute of the plurality of font requests is determined. For example, the secondary attribute of the font requests might include any combination of stylistic, contextual, and frequency attributes. At step 410, an association between the plurality of font requests is determined based on the clustering analysis and the secondary attribute parameter. At step 412, a font substitution hierarchy for individual font requests is based on the association.

Figure 5:
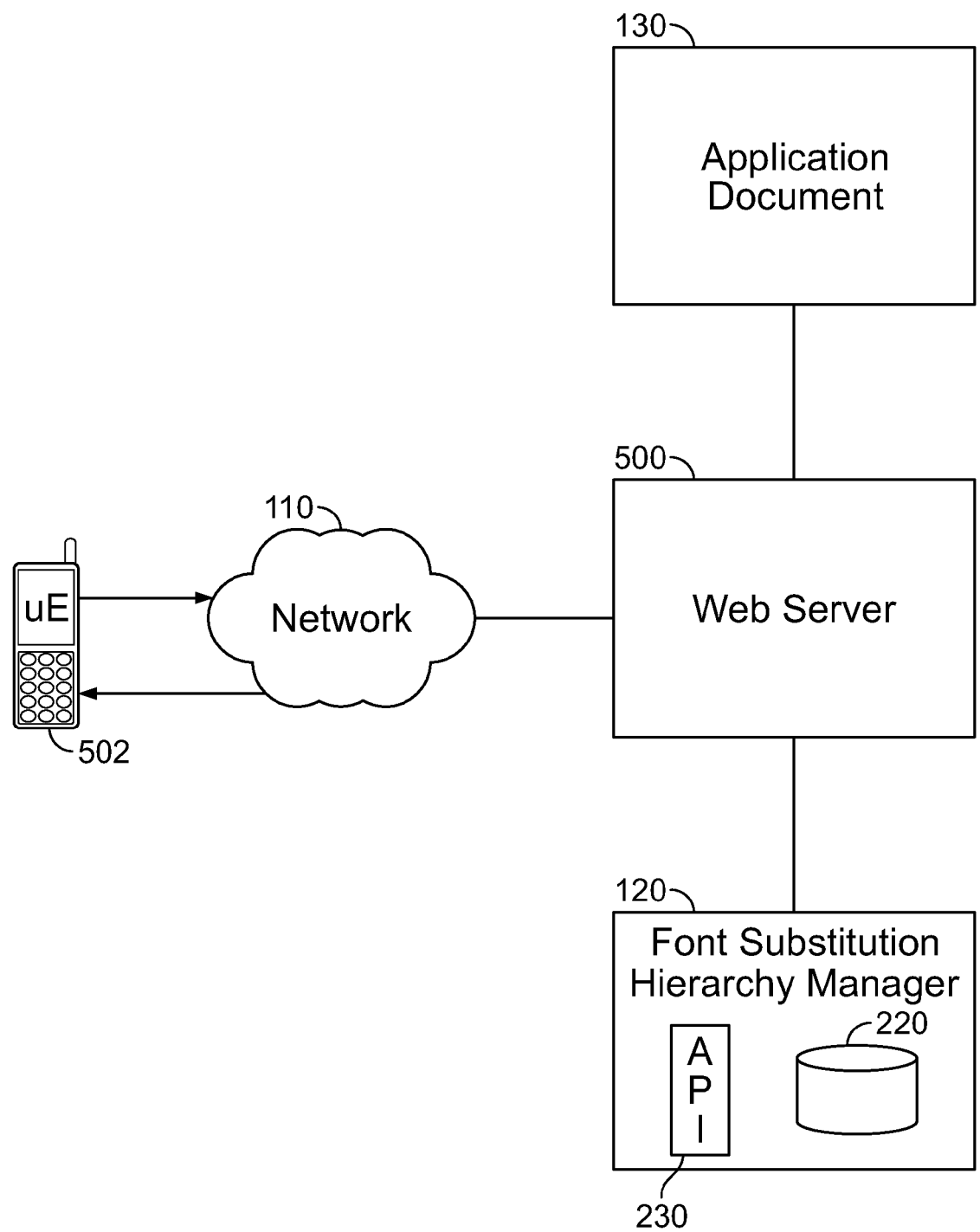
FIG. 5 is a diagram showing an environment for autonomously implementing font substitution in accordance with an embodiment.

FIG. 5 is a diagram showing an environment for autonomously implementing font substitution in accordance with an embodiment. For example, the environment may include a web server 500 for receiving a request for an application document 130 from user equipment (UE) device 502. For example, UE device 502 may be configured to access server 500 via network 110. When a request is received, server 500 may access font substitution manager 120, such as via API 230, to determine a substitute font if a specified font for application document 130 cannot be displayed by UE 502. For example, font substitution manager 120 may include font substitution hierarchies for specified fonts in memory 220 that are determined based on the clustering analysis of FIGS. 4A and/or 4B above.

Figure 6:
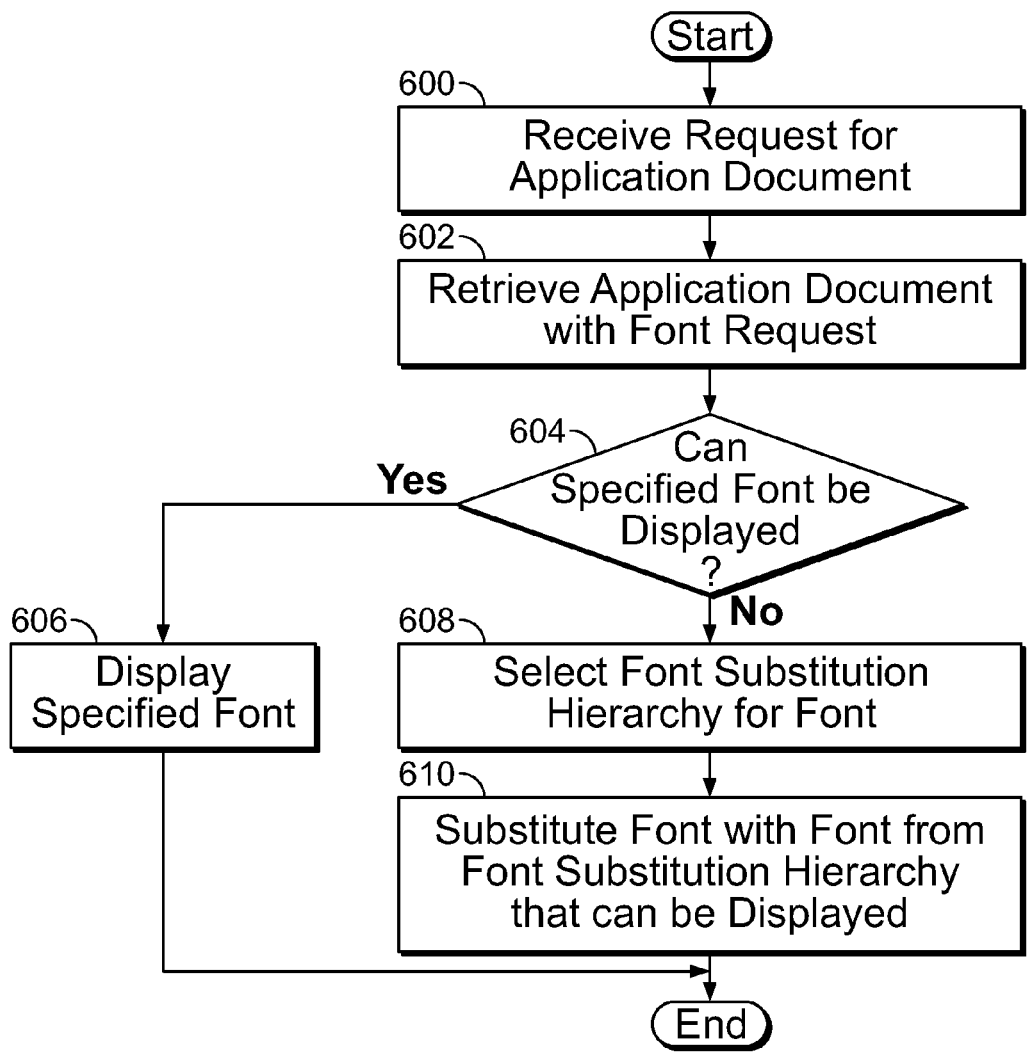
FIG. 6 is a flowchart of a process for autonomously implementing font substitution in accordance with an embodiment.

FIG. 6 is a flowchart of a process for autonomously implementing font substitution in accordance with an embodiment. At step 600, server 500 receives a request for an application document. For example, server 500 may receive the request from user equipment device 502 via network 110. At step, 602, server 500 retrieves the application document 130 including the font request files associated with the application document. For example, application document 130 may be a web-based document accessible via the World Wide Web. As such, server 500 may retrieve the document by calling a URL address or, alternatively, by accessing a memory device that contains application document 130. At step 604, server 500 accesses the font request files to determine whether a specified font can be displayed by the requesting UE 502. If a specified font can be displayed, the server 500 can transmit the application document 130 to the UE 502 for display using the specified font at step 606. If a specified font cannot be displayed, server 500 selects a font substitution hierarchy for the specified font at step 608. For example, server 500 may select a font substitution hierarchy determined based on an association between a plurality of font requests within a plurality of font request files, and wherein the association is based on a clustering analysis as described in FIGS. 4A and/or 4B above. Alternatively, a user associated with user equipment device 502 may make use of the font request files accessed by server 500 to select a fallback font by requesting a font substitution hierarchy for a particular font from server 500. A font substitution hierarchy for a particular font may also be distributed asynchronously to user equipment device 502 at various (e.g., semi-regular) time intervals. At step 610, server 500 automatically substitutes the specified font with a font from the font substitution hierarchy that can be display on UE 502. For example, server 500 will substitute the specified font for the first font of the font substitution hierarchy if UE 502 is able to display the first font. If UE 502 cannot display the first font, server 500 will select a next font of the hierarchical order (as determined based on the clustering analysis of FIGS. 4A and/or 4B) for a substitute font.

In various embodiments, the method steps described herein, including the method steps described in FIGS. 4A, 4B and/or 6, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 4A, 4B and/or 6. Certain steps of the methods described herein, including one or more of the steps of FIGS. 4A, 4B and/or 6, may be performed by a server or by another processor in a network-based cloud-computing system. Certain steps of the methods described herein, including one or more of the steps of FIGS. 4A, 4B and/or 6, may be performed by a client computer in a network-based cloud computing system. The steps of the methods described herein, including one or more of the steps of FIGS. 4A, 4B and/or 6, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 4A, 4B and/or 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
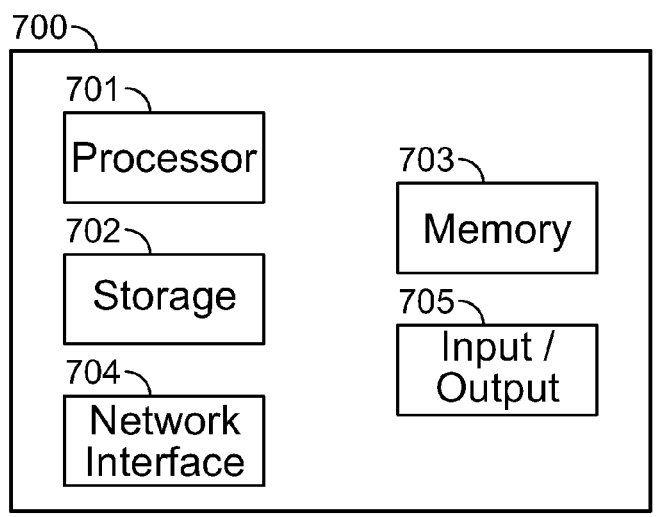
FIG. 7 is a high-level block diagram of an exemplary computer that may be used for determining a font substitution hierarchy.

A high-level block diagram of an exemplary computer that may be used to implement systems, apparatus and methods described herein is illustrated in FIG. 7. Computer 700 includes a processor 701 operatively coupled to a data storage device 702 and a memory 703. Processor 701 controls the overall operation of computer 700 by executing computer program instructions that define such operations. The computer program instructions may be stored in data storage device 702, or other computer readable medium, and loaded into memory 703 when execution of the computer program instructions is desired. Thus, the method steps of FIGS. 4A, 4B and/or 6 can be defined by the computer program instructions stored in memory 703 and/or data storage device 702 and controlled by the processor 701 executing the computer program instructions. For example, the computer program instructions can be implemented as computer executable code programmed by one skilled in the art to perform an algorithm defined by the method steps of FIGS. 4A, 4B and/or 6. Accordingly, by executing the computer program instructions, the processor 701 executes an algorithm defined by the method steps of FIGS. 4A, 4B and/or 6. Computer 700 also includes one or more network interfaces 704 for communicating with other devices via a network. Computer 700 also includes one or more input/output devices 705 that enable user interaction with computer 700 (e.g., display, keyboard, mouse, speakers, buttons, etc.).

Processor 701 may include both general and special purpose microprocessors, and may be the sole processor or one of multiple processors of computer 700. Processor 701 may include one or more central processing units (CPUs), for example. Processor 701, data storage device 702, and/or memory 703 may include, be supplemented by, or incorporated in, one or more application-specific integrated circuits (ASICs) and/or one or more field programmable gate arrays (FPGAs).

Data storage device 702 and memory 703 each include a tangible non-transitory computer readable storage medium. Data storage device 702, and memory 703, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 705 may include peripherals, such as a printer, scanner, display screen, etc. For example, input/output devices 705 may include a display device such as a cathode ray tube (CRT) or liquid crystal display (LCD) monitor for displaying information to the user, a keyboard, and a pointing device such as a mouse or a trackball by which the user can provide input to computer 700.

Any or all of the systems and apparatus discussed herein, including font substitution hierarchy manager 120, and components thereof, including clustering analysis module 200, secondary attribute analysis module 210, memory 220, and API 230 may be implemented using a computer such as computer 700.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of this disclosure. Those skilled in the art could implement various other feature combinations without departing from the scope and spirit of this disclosure.

We claim:

1. A method for determining a font substitution hierarchy, the method comprising:
   identifying a plurality of font request files associated with web-based application documents;
   generating n-gram strings of hierarchically ordered font request subsequences for a plurality of font requests within the plurality of font request files;
   determining a parameter associated with a secondary attribute of the plurality of font requests based on a frequency of instances where two or more font requests appear in sequence in the plurality of font request files;
   determining an association between the plurality of font requests based on a clustering analysis and the parameter, wherein the clustering analysis is based at least in part on one or more of the n-gram strings; and
   determining a font substitution hierarchy for an individual font request based on the association between the plurality of font requests based on the clustering analysis and the parameter.

2. The method of claim 1, wherein the clustering analysis comprises generating a plurality of font substitution strings based on the one or more n-grams.

3. The method of claim 2, wherein the font substitution strings are based on a hierarchical ordering of font requests of the one or more n-grams.

4. The method of claim 1, wherein the clustering analysis comprises executing one of a hierarchical agglomerative clustering, k-means clustering or distributed exchange algorithm.

5. The method of claim 1, wherein the secondary attribute is one of a stylistic, contextual or frequency attribute.

6. The method of claim 5, further comprising determining a bias for one or more parameters associated with the frequency attribute based on a commonality between the plurality of font request files.

7. A non-transitory computer-readable medium having program instructions stored thereon, the instructions capable of execution by a processor and defining the steps of:
   identifying a plurality of font request files associated with web-based application documents;
   generating n-gram strings of hierarchically ordered font request subsequences for a plurality of font requests within the plurality of font request files;
   determining a parameter associated with a secondary attribute of the plurality of font requests based on a frequency of instances where two or more font requests appear in sequence in the plurality of font request files;

determining an association between the plurality of font requests based on a clustering analysis and the parameter, wherein the clustering analysis is based at least in part on one or more of the n-gram strings; and determining a font substitution hierarchy an individual font request based on the association between the plurality of font requests based on the clustering analysis and the parameter.

8. The non-transitory computer-readable medium of claim 7, wherein the clustering analysis comprises generating a plurality of font substitution strings based on the one or more n-grams.

9. The non-transitory computer-readable medium of claim 8, wherein the font substitution strings are based on a hierarchical ordering of font requests of the one or more n-grams.

10. The non-transitory computer-readable medium of claim 7, wherein the clustering analysis comprises executing one of a hierarchical agglomerative clustering, k-means clustering or distributed exchange algorithm.

11. The non-transitory computer-readable medium of claim 7, wherein the secondary attribute is one of a stylistic, contextual or frequency attribute.

12. The non-transitory computer-readable medium of claim 11, further comprising instructions defining the step of:

determining a bias for one or more parameters associated with the frequency attribute based on a commonality between the plurality of font request files.

13. A method, comprising:

receiving a request for an application document;

retrieving the application document, wherein the application document includes a font request;

determining that a primary font specified in the font request cannot be displayed;

selecting a font substitution hierarchy for the primary font, wherein the font substitution hierarchy is determined by:

identifying a plurality of font request files associated with web-based application documents;

generating n-gram strings of hierarchically ordered font request subsequences for a plurality of font requests within the plurality of font request files;

determining a parameter associated with a secondary attribute of the plurality of font requests based on a frequency of instances where two or more font requests appear in sequence in the plurality of font request files;

determining an association between the plurality of font requests based on a clustering analysis and the parameter, wherein the clustering analysis is based at least in part on one or more of the n-gram strings; and determining the font substitution hierarchy based on the association between the plurality of font requests based on the clustering analysis and the parameter; and substituting the primary font with a font that can be displayed based on the font substitution hierarchy.

14. An apparatus, comprising:

means for receiving a request for an application document;

means for retrieving the application document, wherein the application document includes a font request;

means for determining that a primary font specified in the font request cannot be displayed;

means for selecting a font substitution hierarchy for the primary font, wherein the means for selecting comprises:

means for identifying a plurality of font request files associated with web-based application documents;

means for generating n-gram strings of hierarchically ordered font request subsequences for a plurality of font requests within the plurality of font request files;

means for determining a parameter associated with a secondary attribute of the plurality of font requests based on a frequency of instances where two or more font requests appear in sequence in the plurality of font request files;

means for determining an association between the plurality of font requests based on a clustering analysis and the parameter, wherein the clustering analysis is based at least in part on one or more of the n-gram strings; and means for determining the font substitution hierarchy based on the association between the plurality of font requests based on the clustering analysis and the parameter; and means for substituting the primary font with a font that can be displayed based on the font substitution hierarchy.

\* \* \* \* \*